United States Patent
Tranquilla

[11] Patent Number: 6,074,533
[45] Date of Patent: Jun. 13, 2000

[54] METHOD AND APPARATUS FOR OPTIMIZATION OF ENERGY COUPLING FOR MICROWAVE TREATMENT OF METAL ORES AND CONCENTRATES IN A MICROWAVE FLUIDIZED BED REACTOR

[75] Inventor: James M. Tranquilla, Fredericton, Canada

[73] Assignee: EMR Microwave Technology Corporation, New Brunswick, Canada

[21] Appl. No.: 09/290,893

[22] Filed: Apr. 14, 1999

Related U.S. Application Data

[62] Division of application No. 08/693,380, Aug. 6, 1996.
[51] Int. Cl.⁷ ............................................ C07C 1/00
[52] U.S. Cl. ............................................ 204/157.15
[58] Field of Search ................................. 204/157.15

[56] References Cited

U.S. PATENT DOCUMENTS

| | | | |
|---|---|---|---|
| 3,528,179 | 9/1970 | Smith | 34/1 |
| 4,126,945 | 11/1978 | Manser et al. | 34/4 |
| 4,476,098 | 10/1984 | Nakamori et al. | 422/140 |
| 4,511,362 | 4/1985 | Ravindram et al. | 44/1 |
| 4,967,486 | 11/1990 | Doelling | 34/1 |
| 5,051,456 | 9/1991 | Bernier et al. | 523/300 |
| 5,382,412 | 1/1995 | Kim et al. | 422/142 |

*Primary Examiner*—Kathryn Gorgos
*Assistant Examiner*—Edna Wong
*Attorney, Agent, or Firm*—Morgan, Lewis & Bockius LLP

[57] ABSTRACT

The present invention provides a new and useful method for controlling microwave energy distribution in the reaction chamber of a fluidized bed reactor by tapering the reaction zone of the reaction chamber so that the cross-section diameter at the lower end differs from the cross-section diameter at the upper end by a factor of $\sqrt{\epsilon_r}$.

4 Claims, 15 Drawing Sheets

METHOD AND APPARATUS FOR OPTIMIZATION OF ENERGY COUPLING FOR MICROWAVE TREATMENT OF METAL ORES AND CONCENTRATES IN A MICROWAVE FLUIDIZED BED REACTOR

This is a divisional of application Ser. No. 08/693,380 filed on Aug. 6, 1996 pending.

FIELD OF INVENTION

This invention generally relates to an apparatus and method for optimizing the use of microwave energy in the reaction chamber of a fluidized bed reactor.

BACKGROUND OF THE INVENTION

When designing microwave reaction cavities it is assumed that the filling dielectric is air (where $\epsilon=1$) and the dimensions and shape of the cavity are normally selected on this basis. It is, however, known that the effect of a dielectric material must be considered in the design of a waveguide and similar components whose dimensions must be related to the wavelength of the electromagnetic energy within the component. The presence of a dielectric where permittivity is greater than that of air ($\epsilon>1$), for example, will cause the wavelength within the dielectric to be shorter than that in air. In this way, waveguides or chambers of fixed physical dimensions will appear to be effectively larger when filled with dielectric material of higher permittivity, because of an apparent increase in effective size due to the increased number of wavelengths accommodated in the dielectric. The scaling effect is proportional to the square root of the relative permittivity ($\epsilon_r$) of the dielectric.

It has been known for some time that certain metallurgical effects can be brought about in metal bearing ores and mineral concentrates by treatment with microwaves such that the ore or concentrate becomes more amenable to conventional recovery techniques, such as leaching. For example, it is known that refractory gold concentrates can be treated with microwaves to transform pyrites into pyrrhotite and hematite, the latter being more reactive than the former and thus more readily processed by conventional techniques. Similar processes have been carried out at bench scale for the recovery of molybdenum and rhenium from their sulphide ores; recovery of nickel, cobalt and manganese from their oxides and silicates; and recovery of copper from its ores.

Fluidized bed reactors are presently widely used in many ore processing applications where strong interaction between a solid product and gas medium is required and the use of microwave energy to provide some or all of the required reaction energy has been disclosed in, for example, U.S. Pat. Nos. 3,528,179, 4,126,945, 4,967,486, 4,511,362, 4,476,098, 5,382,412 and 5,051,456.

Where microwave energy is used in association with a fluidized bed reactor, the reaction chamber, or cavity, typically consists of at least two zones; one is the region near the bed or base of the reactor where the fluidizing gas is usually introduced into the material and includes the mass of the material in its suspended state (the reaction zone). The second zone is the region above the reacting mass of material, consisting primarily of the fluidizing gas or gaseous reaction products but containing comparatively little of the mass of material. The delineation of these two zones may be established by adjusting the fluidizing pressure or gas velocity so as to cause the reacting material not to occupy the upper vessel region; alternatively, this delineation may be established through use of a filter screen assembly which prevents particle flow into the upper vessel region but which is otherwise transparent to microwave energy.

The delineation of these two zones within the reaction chamber is especially pronounced when the load of material or its charge consists of a relatively dense dielectric of high permittivity such as granulated ores, soils, etc. The coexistence of two or more regions of differing dielectric properties within the chamber will generally result in a situation where the electromagnetic energy cannot transmit smoothly from one region to another, rather what usually occurs is a significant reflection of wave energy at the boundaries between the regions and a complete redistribution of energy throughout the regions. This will result in less than optimal energy transfer into the material by the microwaves.

SUMMARY OF THE INVENTION

It has now been discovered that by modifying the loaded reaction zone by reducing its physical dimensions in such a way as to introduce a gradual tapering transition from the upper zone to the lower zone, the dielectric effect can be compensated for and microwave energy distribution in the reaction zone can be maximized.

Thus the invention comprises a fluidized bed reactor for treating particulate material comprising: a reaction chamber, said chamber tapering from an upper to lower position of said chamber; a means for directing a fluidizing gas into the bottom of the reaction chamber and upwardly, so as to establish a fluidized bed of particulate matter within said reaction chamber; and a microwave energy source adapted to propagate microwave energy into said reaction chamber.

The invention also comprises a method for treating particulate matter in a fluidized bed reactor, said method comprising the steps of: feeding the particulate matter into a reaction chamber having at least in part an inverted truncated conical configuration; fluidizing said particulate matter into a bed using a fluidizing gas; and applying microwave energy into the reaction chamber.

The invention further comprises an apparatus for treating particulate matter comprising: a reaction chamber, said chamber tapering from an upper to a lower position of said chamber; and a microwave energy source adapted to propagate microwave energy into said reaction chamber.

BRIEF DESCRIPTION OF THE DRAWINGS

These and other advantages of the invention will become apparent upon reading the following detailed description and upon referring to the drawings in which.

While the invention will be described in conjunction with illustrated embodiments, it will be understood that it is not intended to limit the invention to such embodiments. On the contrary, it is intended to cover all alternatives, modifications and equivalents as may be included within the spirit and scope of the invention as defined by the appended claims.

DETAILED DESCRIPTION OF THE PREFERRED EMBODIMENTS

In the following description, similar features in the drawings have been given similar reference numerals.

Figure 1:
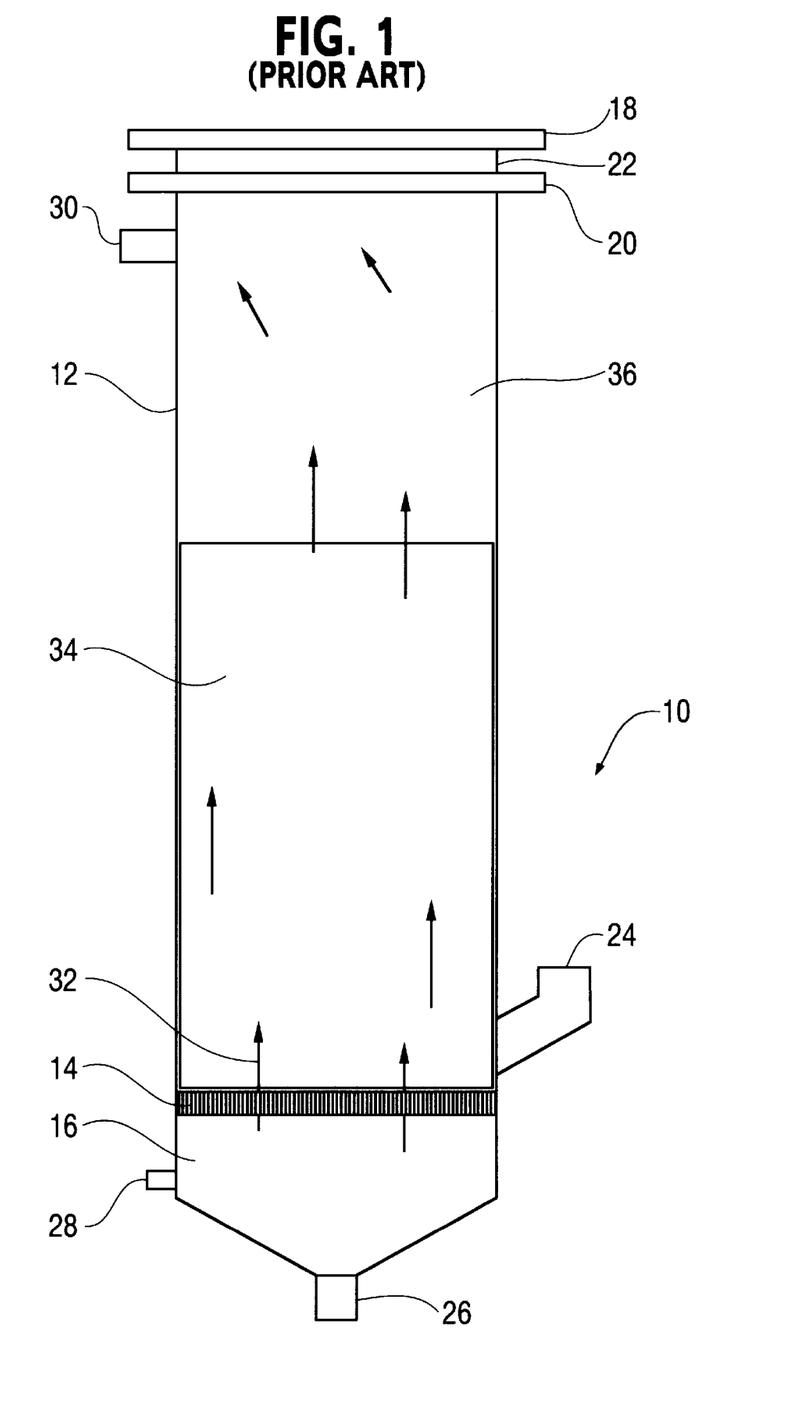
FIG. 1 is a cross sectional view of a uniform cylindrical microwave fluidized bed reactor.
Figure 5:
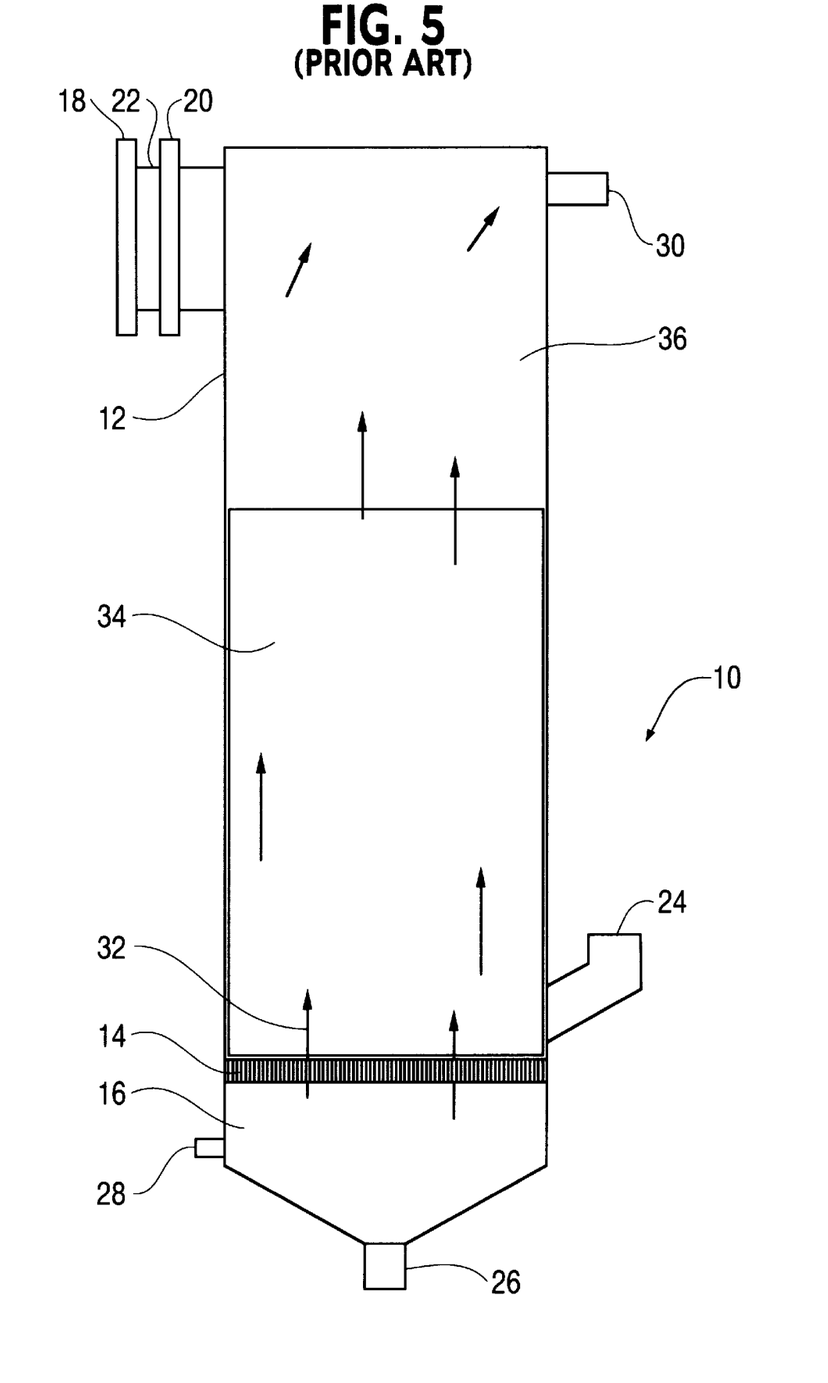
FIG. 5 is a cross sectional view of an alternative embodiment of the fluidized bed reactor of FIG. 1.

As illustrated in FIGS. 1 and 5, a uniform cylindrical microwave fluidized bed reactor 10 comprises a tubular waveguide resonator reaction chamber or cavity 12, bed fluidizer screen 14, and a pressure chamber 16. The reaction chamber 12 is connected to a microwave energy source via waveguide fittings 18 and 20 which may include a coupling iris (not shown) as well as a pressurized gas seal 22. The reaction chamber 12 has a material inlet valve 24, material exit valve 26, gas inlet valve 28 and a gas exhaust port 30.

Particulate material such as ore, concentrate or the like, which is to be processed in the reaction chamber, is introduced through the inlet valve and is fluidized by gas 32 which is supplied through the gas inlet valve 28. The introduction of gas causes the material which has been introduced through the inlet valve to coalesce into a bed 34 which is suspended through the adjustment of the gas pressure in the pressure chamber 16 and the bed fluidizer screen 14. Once the bed is fluidized and ready for treatment with microwave energy, the microwave energy is introduced into the reaction chamber from the top via the waveguide fittings 18 and 22.

The fluidizing gas is continuously pumped through valve 28 and exhausted through port 30 during the treatment process. The region 36 above the suspended fluidized bed 34 is essentially free of solid material and consists primarily of fluidized gas and gaseous reaction products. The gas seal 22 permits the transmission of microwave energy into the reaction chamber 12 while isolating the atmosphere and contents of the chamber from the connecting waveguide attached via fittings 18 and 20.

When the bed is in a fluidized state, the particulate material is heated by microwave energy by either or both dielectric and resistive effects caused by interaction between the electromagnetic field and the solid material constituents.

Once the treatment process has been completed and the fluidized material appropriately heated or processed, it is ejected from the reactor through port 30 by increasing the fluidizing gas pressure. Any material which has fallen through screen 14 during loading and processing of the chamber is removed through valve 26.

Although described as preferably being circular in cross-section, the reaction chamber 12 can be of any appropriate dimension or geometry as dictated by the microwave field distribution. Additionally, while being described as an iris coupled resonator, the reaction chamber may operate as a terminated waveguide (iris fully open) in which case the absorptive action of the load material gives the reactor the characteristics of a travelling-wave applicator.

Figure 2:
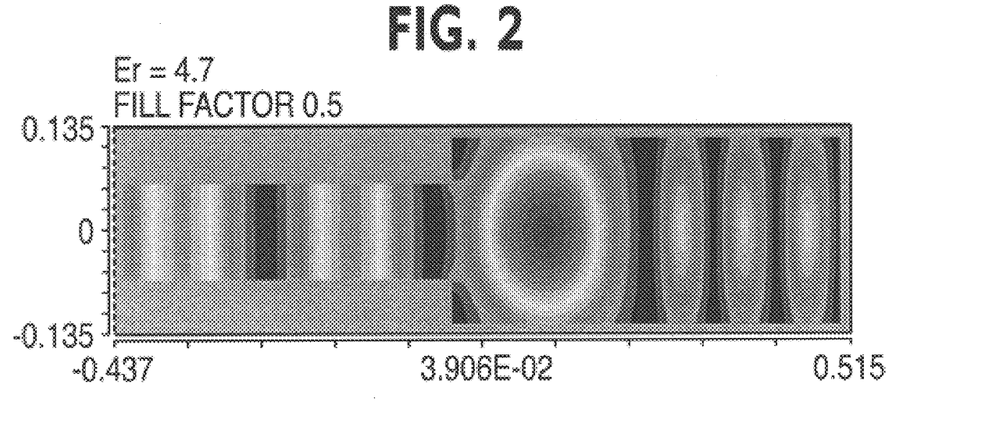
FIG. 2 is graphic representation of the relative energy distribution of the interior of the reactor of FIG. 1 when loaded with process material.
Figure 3:
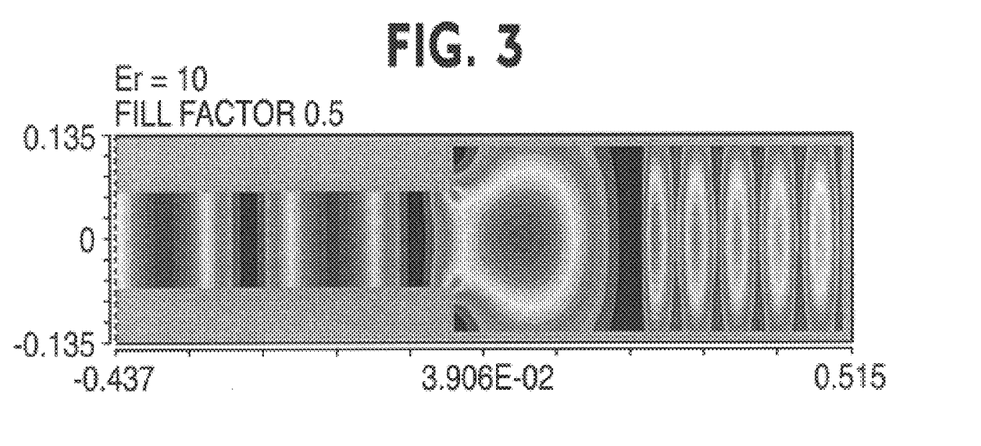
FIG. 3 is graphic representation of the relative energy distribution of the interior of the reactor of FIG. 1 when loaded with process material having a relative dielectric permittivity of 10.
Figure 4:
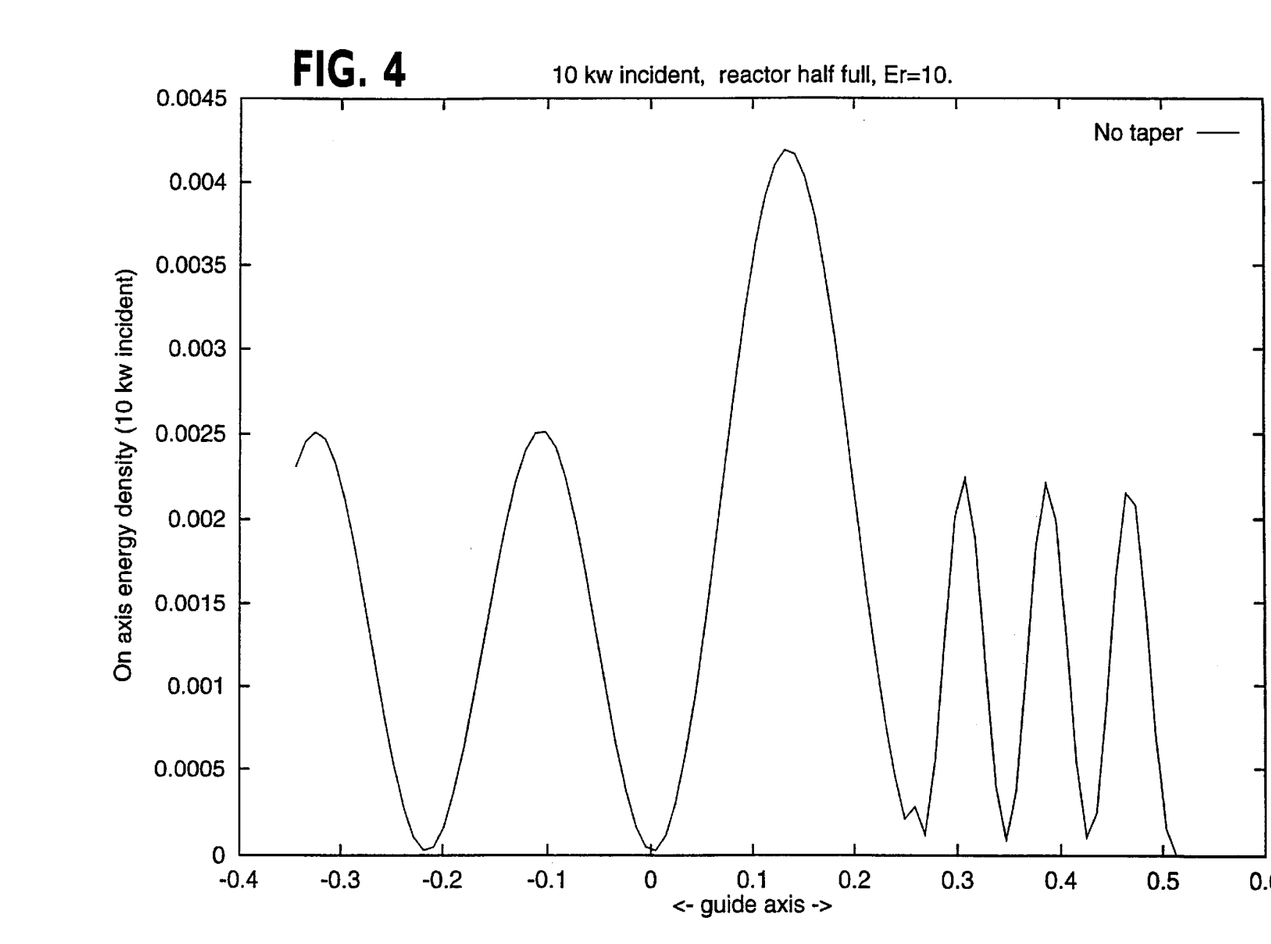
FIG. 4 is a line graph of the relative energy distribution of FIG. 3 along the vertical axis of the fluidizing reactor of FIG. 1.
Figure 6:
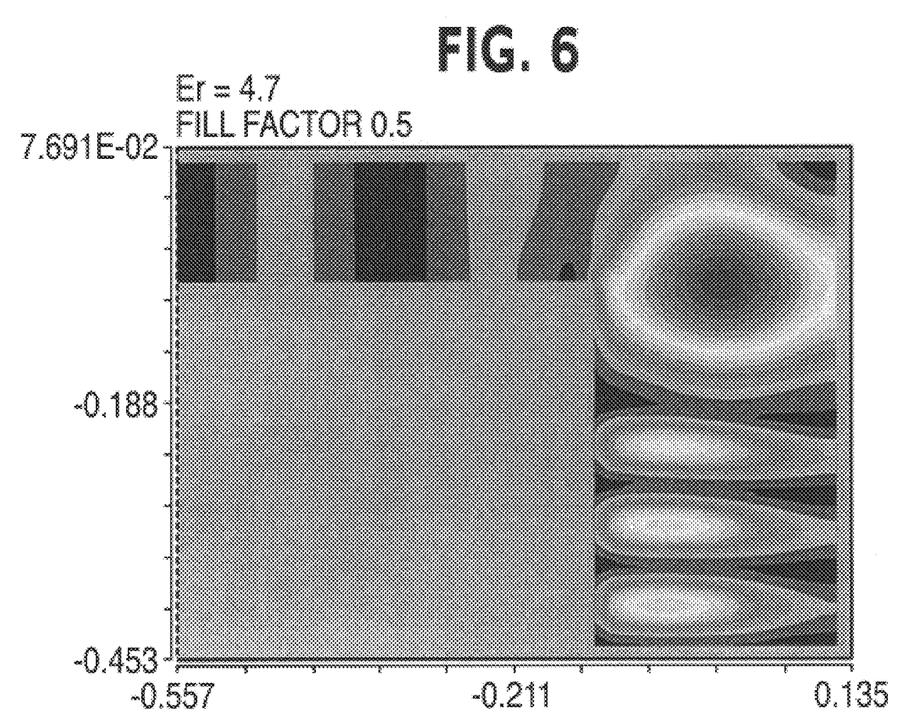
FIG. 6 is graphic representation of the relative energy distribution of the interior of the reactor of FIG. 5 when loaded with process material.

The relative energy distribution inside the reactor of FIGS. 1 and 5, when in operation with material undergoing processing, is depicted in FIGS. 2, 3 and 6. By referring to FIG. 2, it will be seen that the waveguide and reactor chamber are represented, the waveguide by the narrow rectangular portion and the chamber by the larger rectangular portion. In this particular case, the energy density is greatest (as shown by the dark gray shading) in the area immediately below the waveguide in the area above the fluidized bed. The energy density is lowest in the areas with black shading as illustrated by the bar chart in FIG. 2. FIG. 3 illustrates the energy distribution using the same arrangement as in FIG. 1 except that the relative dielectric permittivity of the load material is 10. Again, as was seen in FIG. 2, the energy density is greatest in the area below the waveguide immediately above the fluidized bed. The energy distribution shown in FIG. 3, along the axis of the waveguide and the reactor, is shown using a line graph in FIG. 4. This shows that the energy density peaks at about 0.15 on the axis.

The evident discontinuity illustrated in FIGS. 2 and 6 between the two media in the reaction chamber causes a very high energy concentration in the region above to the reaction bed zone and relatively small energy deposition within the load material. The power reflection coefficient at the interface in this case is 0.96. Accordingly, only 4% of the power passes into the load material.

It is often characteristic of dielectric materials that their permittivity is a strong function of temperature, in many cases dramatically increasing as temperature increases. FIG. 3 illustrates a reacting load material at a processing temperature of 500° C. where the relative permittivity $\epsilon$ is 10. Again, the general energy distribution in the uniform chamber reactor is concentrated above the fluidized bed of material in the load reaction zone.

Figure 7:
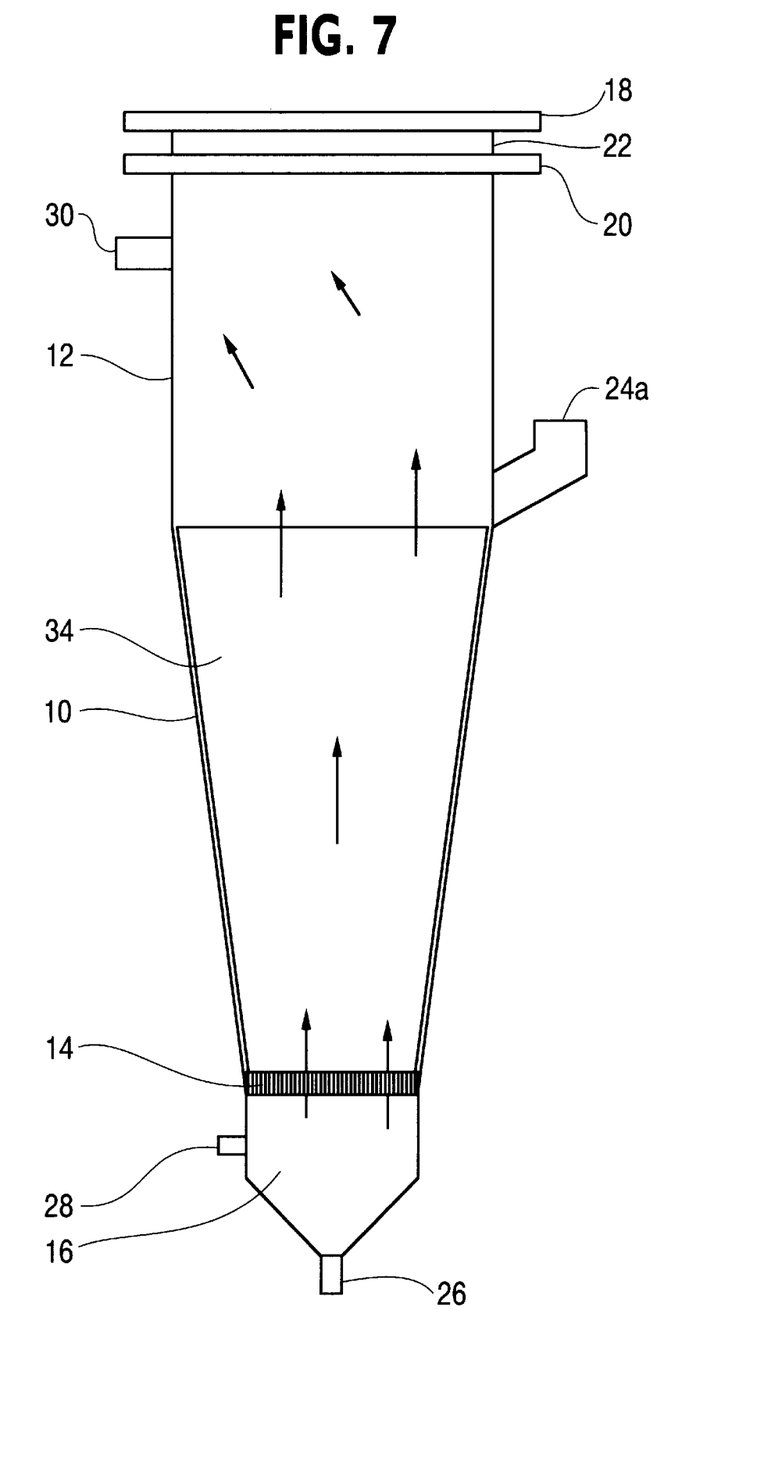
FIG. 7 is a cross sectional view of the fluidized bed reactor according to the present invention.

The fluidized bed reactor of the present invention is illustrated in FIG. 7 wherein the lower portion 38, the load reaction zone, of the reaction chamber 12 is tapered, preferably to approximately 30% to 50% of its upper diameter (in the range of between 8 cm to 12 cm, for a 24 cm full diameter reactor), adjacent the fluidizer screen, and the material inlet valve 24a is positioned in the side of the chamber. The taper is in the load reaction zone of the reaction chamber which carries the material 40 which is to undergo treatment, preferably in a fluidized state. In all other respects the bed reactor is the same as that described in FIG. 1.

In reducing the physical dimensions of the reaction zone it is possible to compensate for the dielectric effect of the materials undergoing treatment. The upper diameter of the chamber is scaled down by the square root of the permittivity of the load material. The permittivity will, of course, depend upon the concentration of solids to be treated in the fluidized solid-gas state, but will usually be somewhat less than the compact (non fluidized) value. The permittivity of materials increases with the density of the material to be treated. This effects the wavelength of the microwave energy moving through the material by reducing it with increasing density. The higher the permittivity the greater the loss of energy and thus the lower the efficiency of the reactor.

Figure 8:
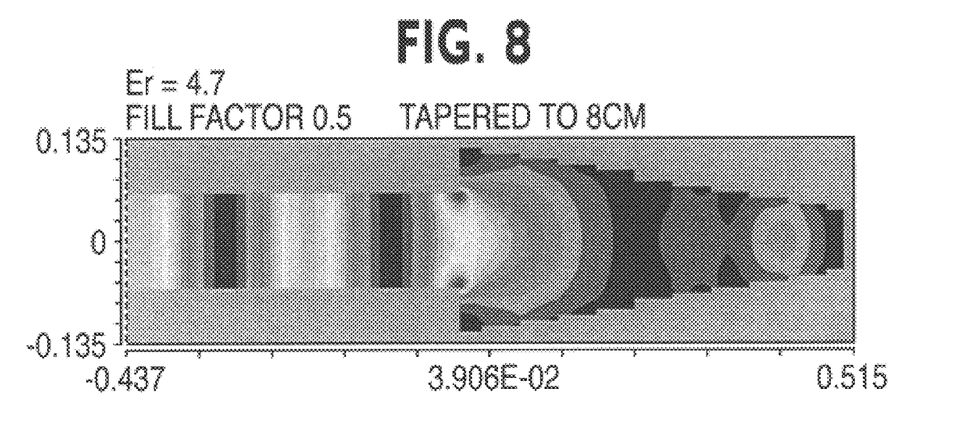
FIGS. 8 to 10 are graphic representations of the relative energy distribution of the interior of the reactor of FIG. 7 when loaded with process material.
Figure 9:
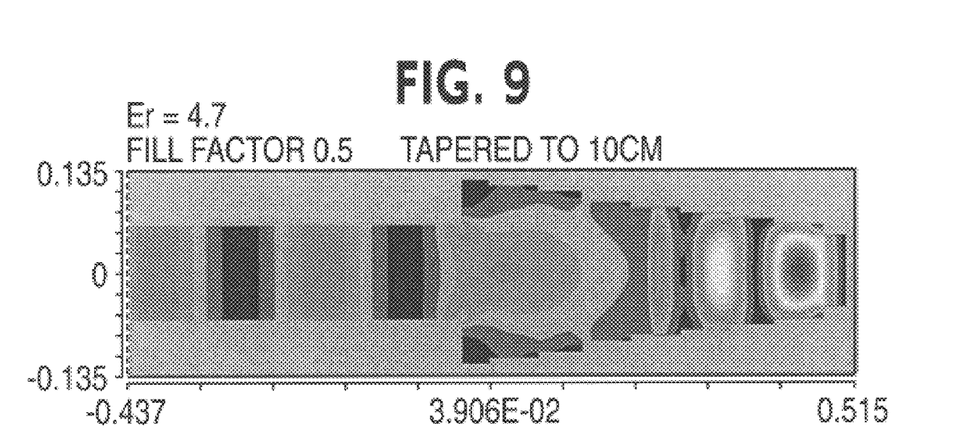
Figure 10:
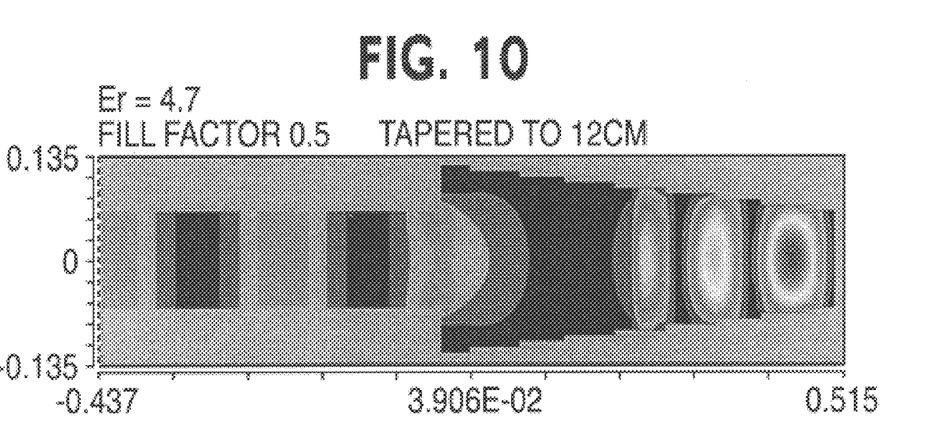
Figure 11:
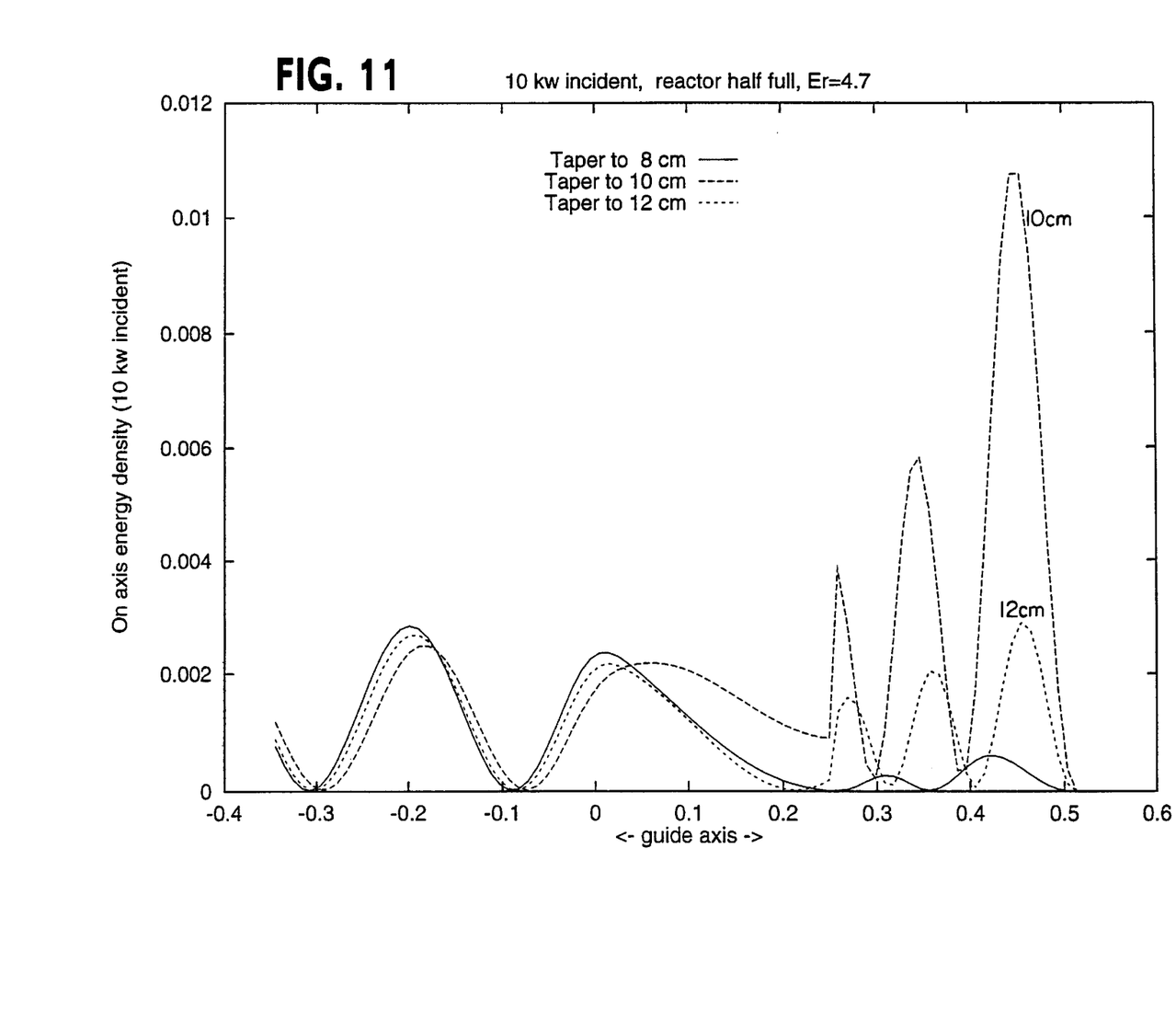
FIG. 11 is a line graph of the relative energy distribution of FIGS. 8–10 along the vertical axis of the fluidizing reactor of FIG. 7.

The relative energy distribution patterns inside various reactors of the present invention are shown in FIGS. 8 to 10, when in operation with load material undergoing processing. The reaction chamber is, respectively, tapered from a diameter 24 cm to 8 cm, 10 cm, and 12 cm at the bottom end. A line graph of the energy distribution along the axis of the feed waveguide is provided in FIG. 11. It will be seen from FIGS. 10 and 11 that with the 12 cm diameter tapered reaction chamber, the best results are achieved with a relatively even deposition of energy throughout the load. In this embodiment there is a power reflection coefficient of 0.32 at the interface between the two reactor zones, meaning that 68% of the input power enters into the load material. In contrast to the foregoing, when a 10 cm diameter tapered reaction chamber is used the energy density is greatest at the bottom of the reaction chamber, as seen in FIG. 9, at about 0.45 on the axis (see FIG. 11).

Another mechanical advantage of the present invention over the standard tubular reaction chamber is that the fluidizing gas slows, due to the increase in volume of the reaction chamber, as it rises up through the chamber. Accordingly, there tends to be less material forced off the top of the suspended bed of material by the force of the gas.

Figure 12:
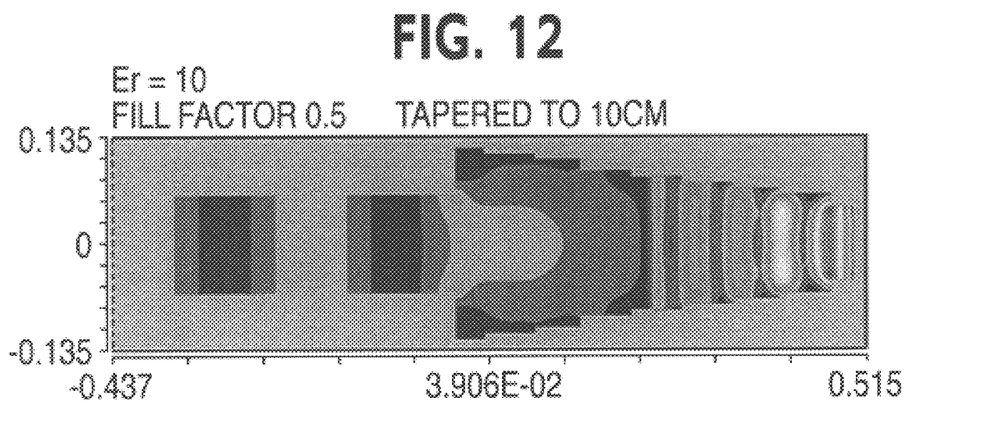
FIGS. 12 to 14 are graphic representations of the relative energy distribution of the interior of the reactor of FIG. 7 when loaded with process material having a relative dielectric permittivity of 10.
Figure 13:
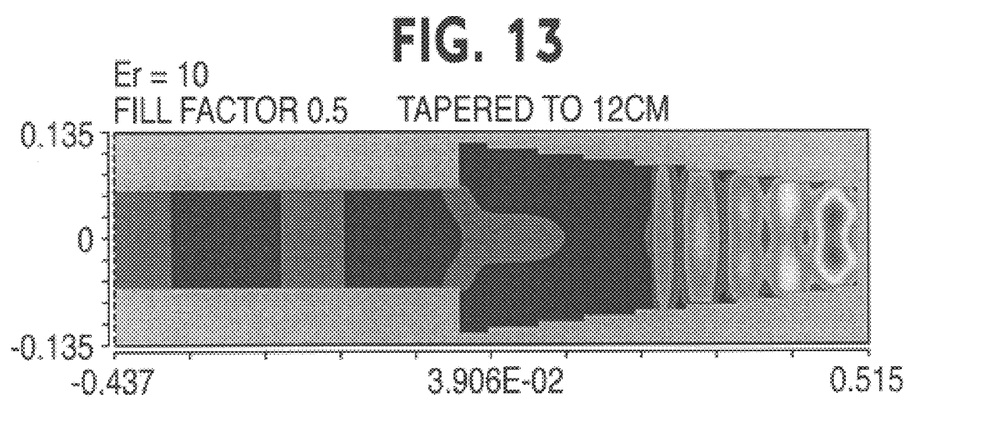
Figure 14:
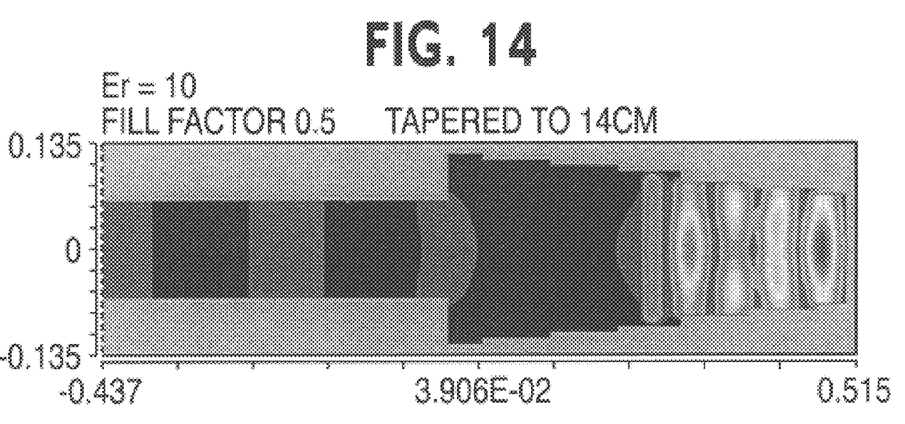

FIGS. 12 to 14 illustrate the energy distribution using the same arrangement as in FIG. 7 except that the relative dielectric permittivity of the load material is 10. Again, the use of a tapered reaction chamber facilitates control of the energy density distribution both inside the fluidized zone and within the region above the fluidized mass.

Figure 15:
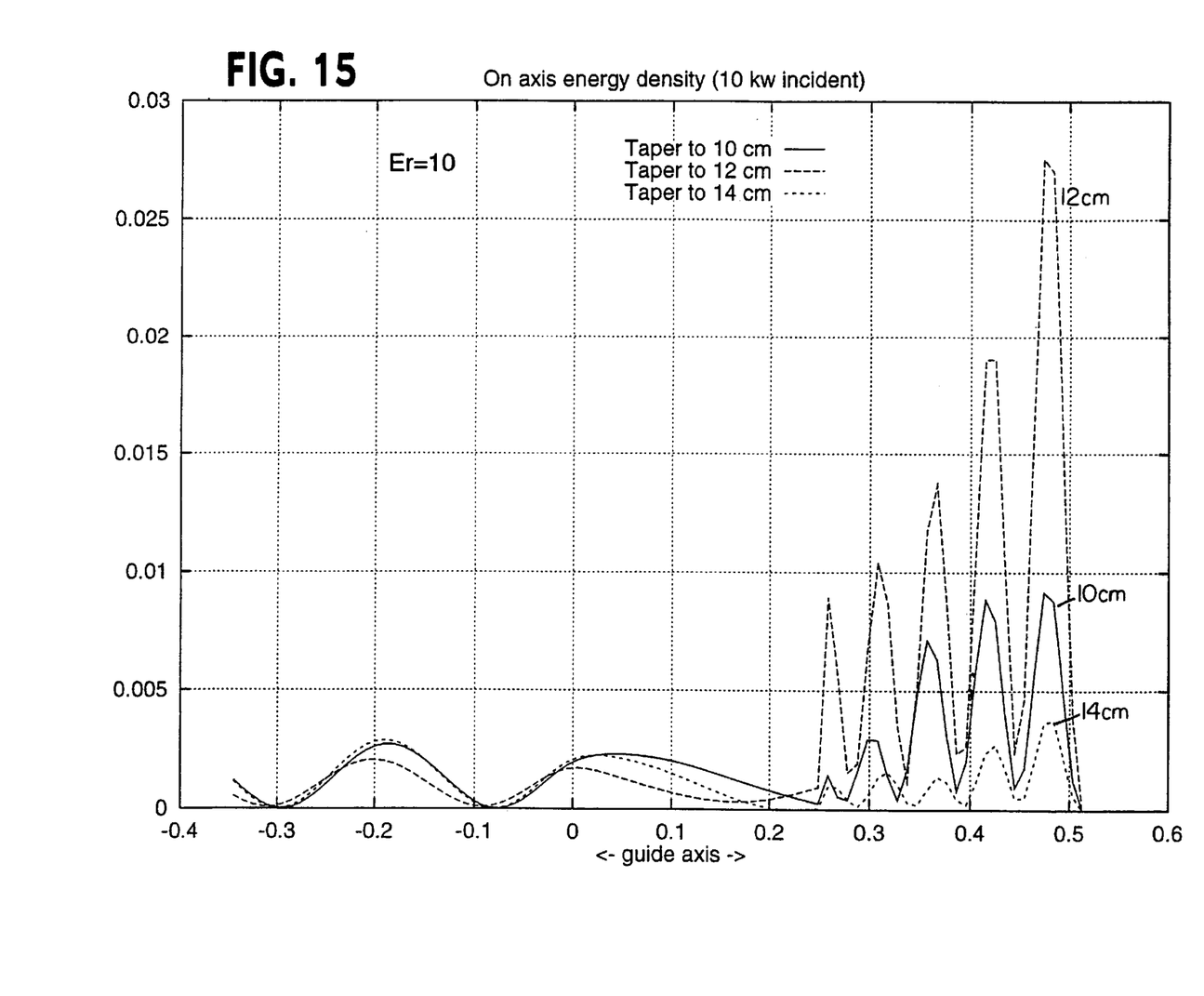
FIG. 15 is a line graph of the relative energy distribution of FIGS. 12–14 along the vertical axis of the fluidizing reactor of FIG. 7.

As best seen in FIG. 15, in this case a relatively even energy distribution in the bed is obtained using 10 cm, 12 cm and 14 cm tapers, although the 12 cm taper provides the greatest energy peaks.

Although the arrangement of the microwave feed with respect to the fluidized bed reactor described heretofore positions the reactor as a linear extension of the microwave waveguide as shown, for example, in FIG. 1, this invention also contemplates other feed arrangements. To illustrate the general applicability of this, FIG. 5 illustrates an arrangement where the microwave feed is accomplished by the waveguide entering the reactor at the sidewall. FIG. 6 shows the energy distribution pattern in the uniform reactor, demonstrating the high concentration in the reactor region above the fluidized zone, and FIGS. 16 to 18 present the effects of tapering the reactor as in the previous examples.

Figure 16:
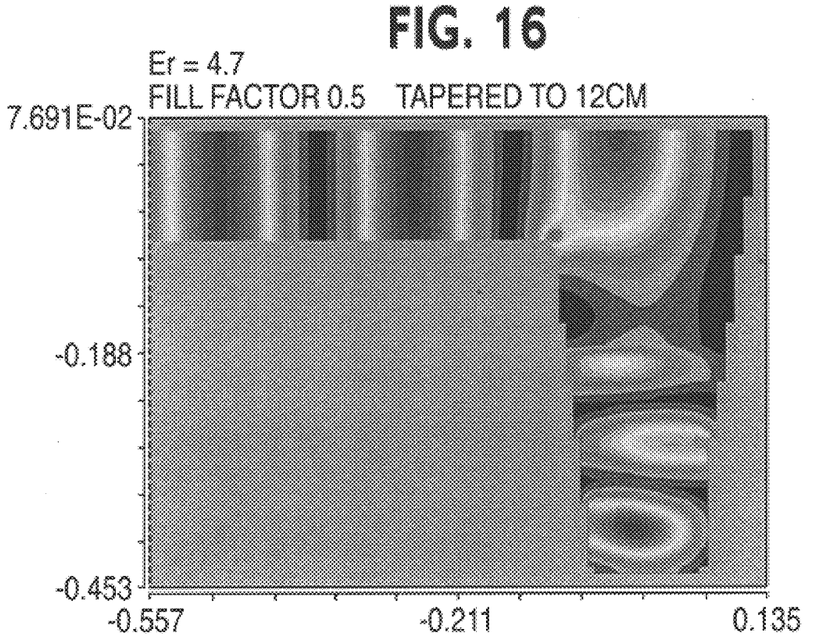
FIGS. 16 to 18 show energy distribution patterns within the uniform and tapered bed reactors where microwave energy is applied from the top left side of the reactor.
Figure 17:
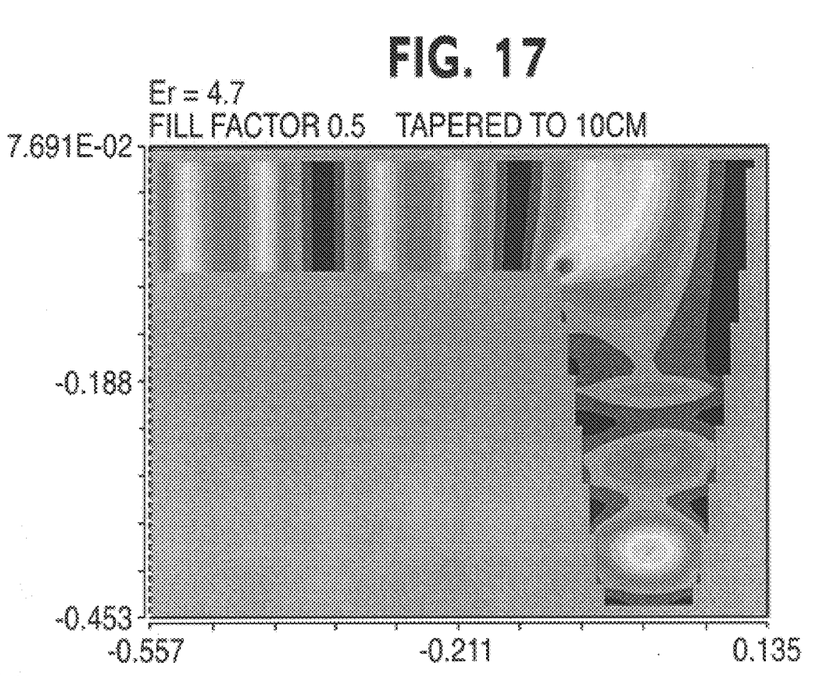
Figure 18:
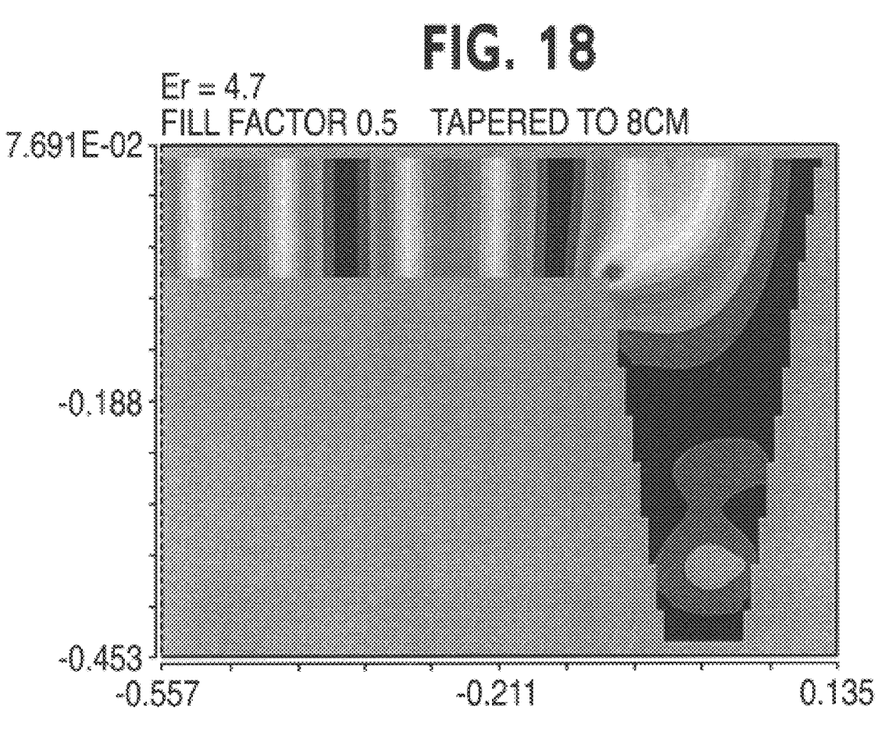
Figure 19:
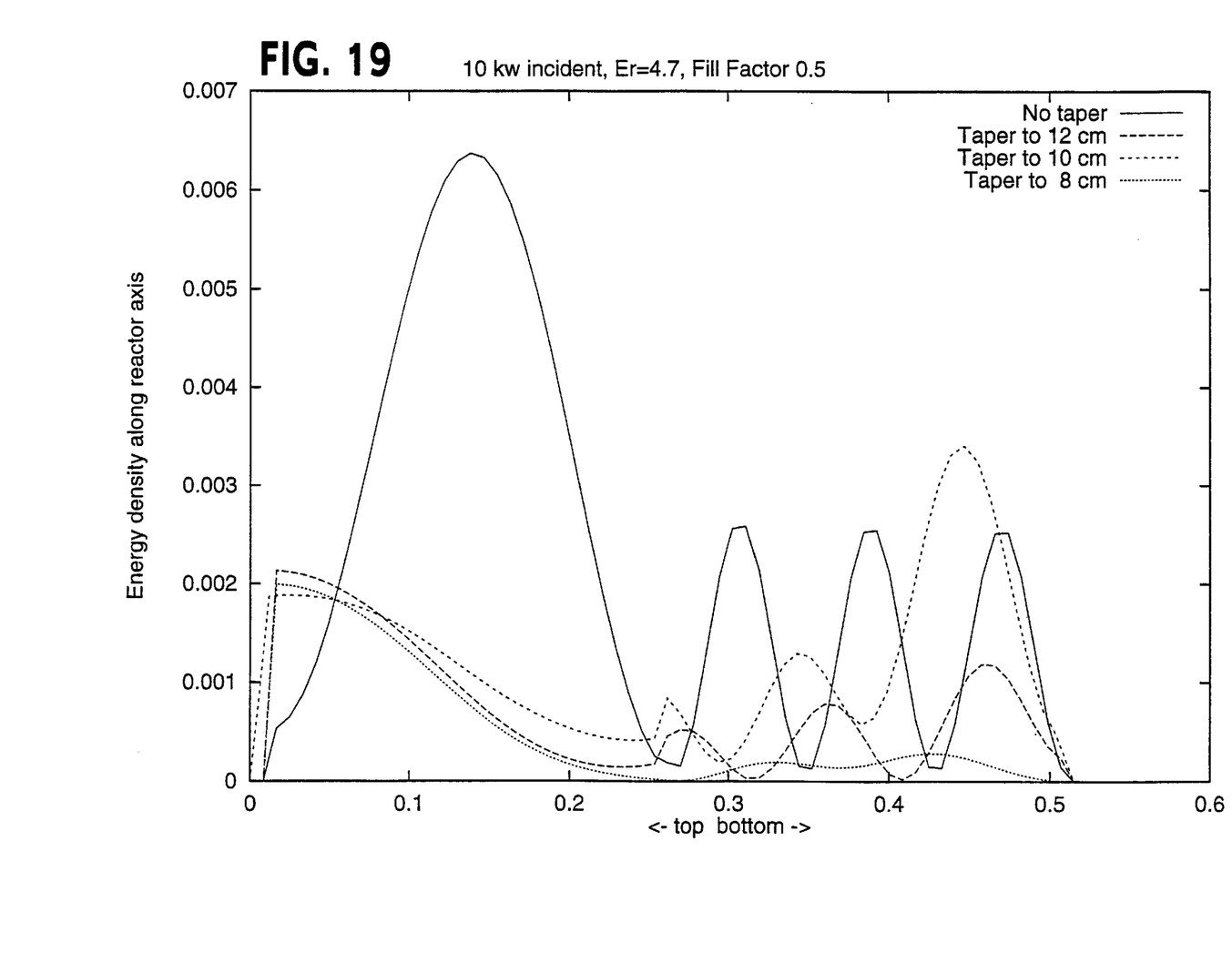
FIG. 19 is a line graph of the relative energy distribution of FIGS. 16–18 along the vertical axis of the fluidizing reactor, where energy is applied from the top left side of the reactor.

The energy distribution shown in FIGS. 16 to 18, along the axis of the feed waveguide of the reactor, is shown using a line graph in FIG. 19. As best seen in FIG. 19, the best energy distribution within the reaction chamber is achieved with a 10 cm taper. Of particular interest is the spike that is present in the waveguide (representing lost energy) when a taper is not provided.

In another embodiment of the present invention, it is not necessary to fluidize the particulate material within the reactor. Instead, the particulate matter may just be subjected to a trickle of gas up through the bed, or indeed not at all. However, the particulate matter will still receive a high concentration of microwave energy due to the shape of the reaction chamber.

Thus, it is apparent that there has been provided in accordance with the invention a method and apparatus for optimization of energy coupling for microwave treatment of metal ores and concentrates in a microwave fluidized bed reactor that fully satisfies the objects, aims and advantages set forth above. While the invention has been described in conjunction with specific embodiments thereof, it is evident that many alternatives, modifications and variations will be apparent to those skilled in the art in light of the foregoing description. Accordingly, it is intended to embrace all such alternatives, modifications and variations as fall within the spirit and broad scope of the invention.

What I claim as my invention:

1. A method for microwave treatment of fluidized particulate material, said method comprising:

(a) forming a reactor chamber for holding particulate material, the reactor chamber including a reaction zone having a lower end and upper end;

(b) determining the dielectric permitivity, $\epsilon_r$, of the particulate material to be treated in the reactor chamber;

(c) tapering the reaction zone so that the cross-section diameter at the lower end differs from the cross-section diameter at the upper end by a factor of $\sqrt{\epsilon_r}$;

(d) placing the particulate material in the reaction zone; and (e) supplying microwave energy into the reaction zone.

2. The method of claim 1, further comprising the step of placing particulate material in the lower end of the reaction zone.

3. The method of claim 1, further comprising the step of forming an upper region of the reactor chamber above the reaction zone, said upper region having a constant cross-section.

4. The method of claim 3, further comprising the step of adjusting the pressure for fluidization of the particulate material such that the fluidized particulate material substantially fills the reaction zone and the upper region is devoid of the fluidized particulate material.

* * * * *